J. I. DOMINGUEZ.
SAFETY DEVICE FOR CATTLE AT RAILWAY CROSSINGS.
APPLICATION FILED MAR. 15, 1919.
1,345,145.
Patented June 29, 1920.
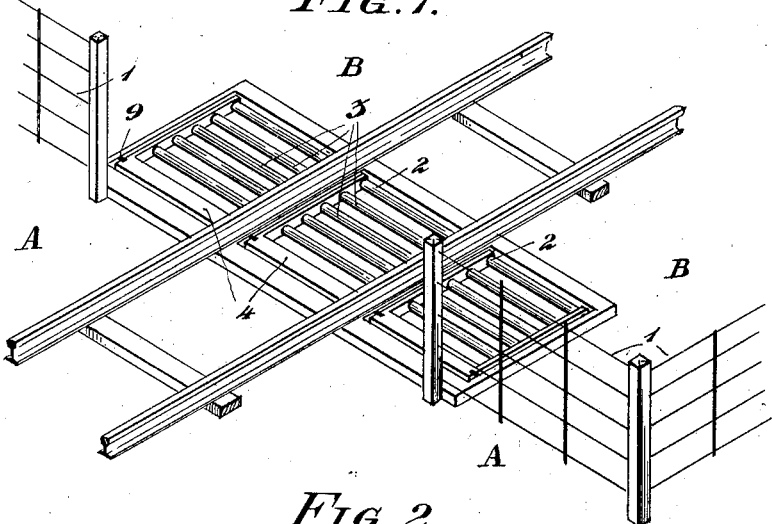
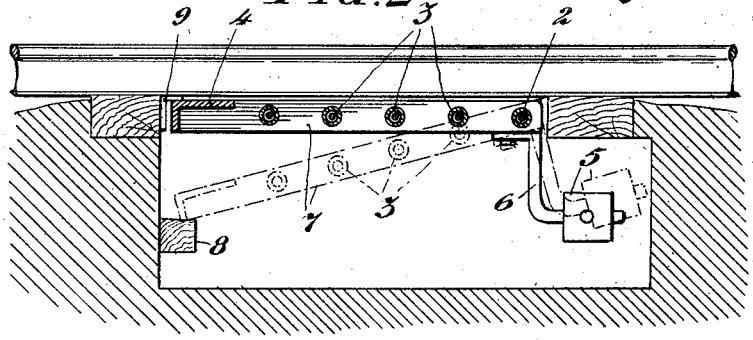
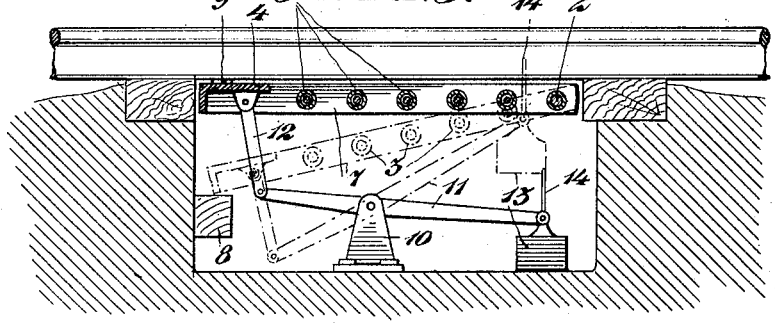
Inventor
JUAN ISMAEL DOMINGUEZ
By Attorneys Munn & Co.

UNITED STATES PATENT OFFICE.

JUAN ISMAEL DOMINGUEZ, OF BUENOS AIRES, ARGENTINA.

SAFETY DEVICE FOR CATTLE AT RAILWAY-CROSSINGS.

1,345,145.   Specification of Letters Patent.   Patented June 29, 1920.

Application filed March 15, 1919. Serial No. 282,869.

*To all whom it may concern:*

Be it known that I, JUAN ISMAEL DOMINGUEZ, a citizen of the Argentine Republic, residing at Calle Maipú 671, Buenos Aires, Argentina, have invented new and useful Improvements in Safety Devices for Cattle at Railway Crossings, of which the following is a specification.

My present invention relates to a novel device destined to be placed at railway level crossings, for preventing cattle or like animals from gaining access to the interior of the tracks.

As is well known, at the sides of all railway level crossings, open ditches, or in some cases, ditches covered by a grating, are arranged in order to prevent cattle or other animals from entering the tracks and thus run the risk of being caught by a train, or, which would be worse, from causing derailments.

The means used up to now, however, only afford relative safety as animals are continually found on the tracks which, after some trials, have learned to readily get across the above mentioned intercepting devices.

Also, some animals, when crossing the ditch, may happen to fall into the same, thereby constituting a serious danger for the train itself, while in case they should succeed in getting out, they may do this at the side of the level crossing as well as by the interior of the track.

The ditches covered by grates or bars are quite unsafe in use as animals will learn to utilize the same as points of support and will soon cross them without difficulty; on the other hand, in case they should fall between the bars, they will hurt themselves and may even be retained thereby, so that the device would rather seem a trap placed expressly to cause the train to collide with the animals.

By the apparatus constructed in accordance with my invention, the above objections are avoided as it will securely prevent any animal from gaining access to the track and that without danger of the same being hurt.

The invention essentially consists of a plain grating provided with rotary rollers and so balanced in its conjoint that when an animal should step thereon, a suitable fraction or part of the device will descend; this will be sufficient to surprise the animal which will immediately recede when noting that it stepped on a false floor. But if the animal should proceed notwithstanding, owing to fast running or simply because it insists on getting through, it will tread on the rotary rollers and owing to the inclined position of the apparatus, it will be unable to take a hold and will soon desist from its purpose.

For the better understanding of this description, detailed drawings have been annexed thereto, in which:

Figure 1 shows an elevation of a cattle guard device, constructed and arranged in accordance with my invention.

Fig. 2 shows, on a larger scale, a cross section of the same apparatus.

Fig. 3 illustrates a modified arrangement of the means for balancing the cattle guard grate.

In said drawings, A represents the side of the level crossing, and B the interior of the track which in Fig. 1 only shows a single line of rails, but which of course may comprise several lines, as will be readily understood.

In any case, in combination with the lateral fences 1 which form the entrance of the level crossing, the intercepting device is placed so as to cover the opening required by the single or multiple track. Each of the parts composing the said apparatus, comprises a grating mounted on a rear axle 2 and provided with a series of rollers 3 which form the grating. At the front, a plate or platform 4 is arranged onto which the animal steps when trying to cross the device. The grating thus formed is maintained in a horizontal position by the counterweights 5, suitably arranged at the rear, either by means of the arms 6 or in an extension of the lateral arms 7 of the grating. The limit of descent of the latter is determined by the detents 8, while its rising motion is limited by projections 9.

Fig. 3 illustrates a modified balancing arrangement for the grate, by means of which the animal is surprised or frightened by the apparition of a board or blade, suitably painted and which projects beyond the grate and appears in the moment when this latter is made to descend.

For that purpose a standard 10 has been arranged in which operates a lever 11, provided with a counterweight and jointed to the front part of the grating by means of a link 12. At the rear part of the lever 11 is mounted the weight 13 which carries the board or blade 14, destined to appear when the grate is made to descend, in the manner shown in said figure.

As will be readily understood, as soon as any animal steps on the board or platform 4, it will at once notice that the latter descends and in consequence, it will immediately recede. In case, however, that the animal should tread on the said board causing the same to descend to its lower limit and try to proceed on the rollers, it will be unable to do so as the said rollers will rotate owing to the inclined position assumed by the conjoint. If to this be added the apparition of the painted board or blade 14, it will be clear that no animal will undertake to cross the device.

Having now particularly described and ascertained the nature of my said invention and in what manner the same is to be performed, I declare that what I claim is:—

1. In a cattle guard, pivoted frames, one between the track and one on each side thereof, each frame having at its free edge a platform and provided with rollers mounted therein to extend transversely of the track, and counterbalancing means connected with each frame for holding it in horizontal position.

2. A cattle guard, comprising a pivoted frame having connecting cross members and a platform at its free end, counterbalancing means for the frame and a member carried by the counterbalancing means and adapted to be projected above the frame when said frame is depressed.

3. A cattle guard, comprising a pivoted frame having rollers mounted therein and provided with a platform at its free end, a weight, means for connecting the weight with the frame to counterbalance the same, and a member carried by the weight and adapted to be projected through the frame when said frame is depressed.

3. A cattle guard, comprising a pivoted frame having connecting cross members and forming a grating, the grating being provided with a platform at its free end, a pivoted lever, a link connecting one end of the lever with the free end of the grating, a weight on the other end of the lever, and a board carried by the weight and adapted to be projected through the grating when said grating is depressed.

JUAN ISMAEL DOMINGUEZ.

Witnesses:
A. L. BELLO,
ROSENDO ROMEN.